United States Patent
Tamura

(10) Patent No.: US 8,482,659 B2
(45) Date of Patent: Jul. 9, 2013

(54) IMAGE PROCESSING APPARATUS AND IMAGE PROCESSING METHOD

(75) Inventor: Nobuhiko Tamura, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 272 days.

(21) Appl. No.: 13/124,419

(22) PCT Filed: Nov. 11, 2009

(86) PCT No.: PCT/JP2009/069518
§ 371 (c)(1), (2), (4) Date: Apr. 15, 2011

(87) PCT Pub. No.: WO2010/071001
PCT Pub. Date: Jun. 24, 2010

(65) Prior Publication Data
US 2011/0199514 A1   Aug. 18, 2011

(30) Foreign Application Priority Data
Dec. 15, 2008   (JP) ................. 2008-318937

(51) Int. Cl.
*G03B 13/00* (2006.01)
(52) U.S. Cl.
USPC .......................... 348/351; 348/349
(58) Field of Classification Search
USPC ............................. 348/335–357
See application file for complete search history.

(56) References Cited

U.S. PATENT DOCUMENTS

| | | |
|---|---|---|
| 2003/0158503 A1 | 8/2003 | Matsumoto |
| 2008/0131018 A1* | 6/2008 | Findlay et al. ............ 382/255 |
| 2008/0240709 A1* | 10/2008 | Nakamura .................. 396/529 |

FOREIGN PATENT DOCUMENTS

| | | |
|---|---|---|
| JP | 2003-275171 A | 9/2003 |
| JP | 2005-136959 A | 5/2005 |
| JP | 2007-156749 A | 6/2007 |
| JP | 2008-298549 A | 12/2008 |

OTHER PUBLICATIONS

Dec. 15, 2009 International Search Report and Written Opinion in International Patent Appln. No. PCT/JP2009/069518.

* cited by examiner

*Primary Examiner* — Sinh Tran
*Assistant Examiner* — Mark Monk
(74) *Attorney, Agent, or Firm* — Fitzpatrick, Cella, Harper & Scinto

(57) ABSTRACT

An image processor inputs image data from an image capturing device, and acquires blur-correction coefficients corresponding to the state of an imaging optical system which forms an image represented by light coming from an object on the image capturing device. Then, the image processor generates a target component and non-target components of blur correction from the image data, applies blur correction to the target component based on the blur-correction coefficients, and generates image data by synthesizing the target component after the blur correction and the non-target components.

8 Claims, 6 Drawing Sheets

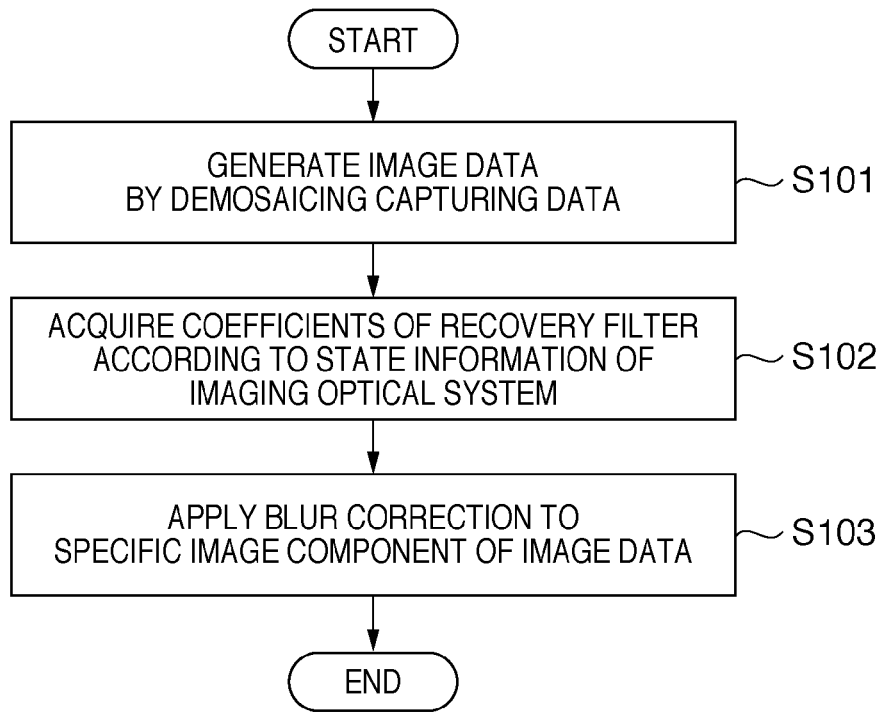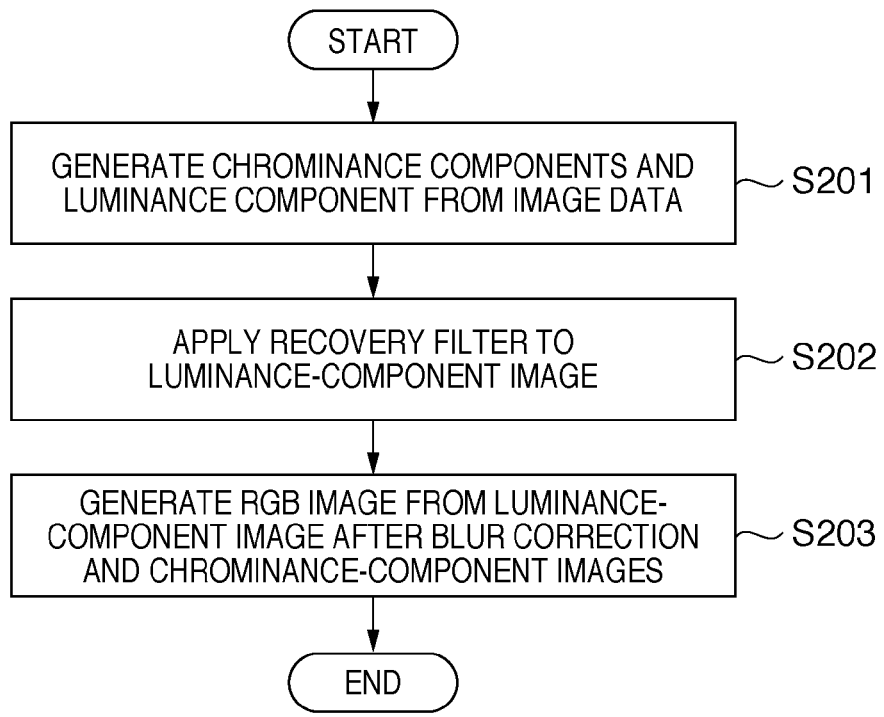

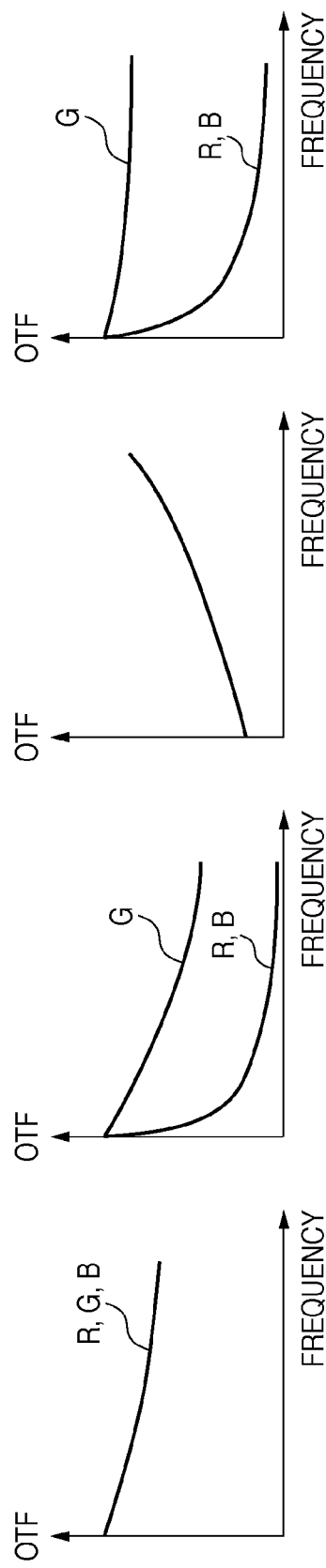

IMAGE PROCESSING APPARATUS AND IMAGE PROCESSING METHOD

TECHNICAL FIELD

The present invention relates to an image processing apparatus and image processing method, which correct any blur of an image caused by an imaging optical system.

BACKGROUND ART

An image capturing apparatus such as a digital still camera or digital video camera guides and forms an image represented by light coming from an object onto a CCD or CMOS sensor as an image capturing device via an imaging optical system including lenses. The image capturing device converts the received light into an electrical signal. Processes such as analog-to-digital (A/D) conversion and demosaicing, which convert an electrical signal into image data, are applied to this electrical signal to obtain a capturing image.

Since light that reaches the image capturing device passes through the imaging optical system, the image quality of the capturing image is influenced by the imaging optical system. For example, when a high-performance lens is used, a capturing image having a high resolution up to its peripheral region can be obtained. Conversely, when an inexpensive low-performance lens is used, the resolution of especially a peripheral region of a capturing image drops considerably.

For example, when an image of starry sky is to be captured, an image captured using a high-performance lens includes an image of each star as a point image. Each star in an image captured using a low-performance lens, however, is not a point image but is blurred. When an image of a person is to be captured, if a high-performance lens is used, an image that records details of hair can be obtained. However, if a low-performance lens is used, an image in which hair is blurred is obtained. That is, when a low-performance lens is used, an image with low definition is obtained.

Such blur is generated even in an in-focus state and depends on the characteristics of the imaging optical system. In other words, capturing images have different resolutions depending on the performances of lenses even in an in-focus state.

A method of correcting any blur of an image caused by an imaging optical system by applying an image process to a capturing image is known. This method applies the image process based on the blur characteristics of the imaging optical system, which are converted in advance into data, thereby correcting any blur of an image caused by the imaging optical system.

In order to convert the blur characteristics of the imaging optical system into data, for example, a method of using a point spread function (PSF) is available. The PSF represents how one point of an object is blurred. For example, when an image of a light-emitting member having a very small volume (point light source) is captured via an imaging optical system in a dark environment, if an ideal imaging optical system is used, light forms a point on a surface (light-receiving surface) of an image capturing device. However, when an imaging optical system which suffers a large blur is used in the same environment, light does not form a point on the light-receiving surface, and has a certain spread. That is, the two-dimensional distribution of light on the light-receiving surface corresponds to the PSF of that imaging optical system. Upon acquiring the PSF of an imaging optical system in practice, an image of an object like a point light source need not be captured. For example, the PSF can be calculated from an image obtained by capturing an image of a chart having black and white edges by a calculation method corresponding to the chart.

As a method of correcting an image blur based on the PSF, a method using an inverse filter is known. Assume that an image of a point light source is captured in a dark environment for the sake of descriptive convenience. Light emanating from the point light source forms a distribution of light having a certain spread on the light-receiving surface. The light is converted into an electrical signal by an image capturing device. When this electrical signal is converted into image data, a digital image obtained by capturing the image of the point light source is obtained. In an image captured using an imaging optical system having a blur, not only a pixel corresponding to the point light source has a nonzero significant pixel value, but also pixels around that pixel have significant pixel values which are close to zero. An image process which converts this image into that having a significant pixel value at nearly one point is inverse filtering. An inverse filter can obtain an image as if it were captured by an imaging optical system with a minimum blur.

The point light source has been exemplified for the sake of descriptive convenience. If light coming from an object is considered as a set of a large number of point light sources, blurs of light components emerging from or reflected by respective portions of the object can be eliminated, and a less-blurred image can be obtained even for an object other than a point light source.

A practical configuration method of an inverse filter will be described below. Let $f(x, y)$ be a capturing image captured using an ideal imaging optical system free from any blur. $(x, y)$ represent a two-dimensional pixel position on the image, and $f(x, y)$ represents the pixel value of a pixel $(x, y)$. On the other hand, let $g(x, y)$ be a capturing image captured using an imaging optical system having a blur. Let $h(x, y)$ be the PSF of the imaging optical system having a blur. Then, f, g, and h meet:

$$g(x, y) = h(x,y) * f(x,y) \quad (1)$$

where * represents a convolution operation.

Image blur correction (to be referred to as blur correction hereinafter) amounts to estimating f captured by a blur-free imaging optical system from the image g captured using the imaging optical system having a blur and h as the PSF of that imaging optical system. By computing the Fourier transform of the above equation to obtain a presentation format in the spatial frequency domain, that equation is expressed by the format of products for respective frequencies like:

$$G(u, v) = H(u, v) \cdot F(u, v) \quad (2)$$

where H is an optical transfer function (OTF) as the Fourier transform of the PSF, u is the spatial frequency in the x-direction, v is the spatial frequency in the y-direction, G is the Fourier transform of g, and F is the Fourier transform of f.

In order to obtain the blur-free capturing image f from the blurred capturing image g, both the sides of equation (2) can be divided by H like:

$$G(u, v)/H(u, v) = F(u, v) \quad (3)$$

By computing the inverse Fourier transform of $F(u, v)$ obtained by equation (3) to restore it to a real space, a blur-free image $f(x, y)$ can be obtained.

Letting R be the inverse Fourier transform of 1/H, a blur-free image is obtained by making a convolution on a real space like:

$$g(x, y) * R(x, y) = f(x, y) \quad (4)$$

R(x, y) in equation (4) is called an inverse filter. In practice, since a division by a divisor=0 is generated at a frequency (u, v) at which H(u, v)=0, the inverse filter R(x, y) requires a slight modification.

Normally, the value of the OTF becomes smaller with increasing frequency, and the value of the inverse filter as the reciprocal of the OTF becomes larger with increasing frequency. Therefore, when the convolution of a capturing image is made using an inverse filter, high-frequency components of the capturing image are emphasized to consequently emphasize noise components (noise components are normally high-frequency components) included in the capturing image. Hence, a method of giving characteristics which do not so emphasize high-frequency components compared to the inverse filter by modifying R(x, y) is known. As a filter which does not so emphasize high-frequency components in consideration of noise, a Wiener filter is popular.

In this way, a blur cannot be perfectly removed due to deviation from ideal conditions, that is, the presence of noise included in the capturing image, that of the frequency at which the OTF=0, and so forth. However, a blur can be reduced by the aforementioned process. Note that a filter used in blur correction such as an inverse filter and Wiener filter will be collectively referred to as a "recovery filter" hereinafter. As described above, the recovery filter is characterized by executing the image process using the PSF of the imaging optical system.

A color image typically has pixel values of RGB three colors per pixel. When blur correction is individually applied to images of R, G, and B planes, a blur of a color image can be reduced. Upon execution of the blur correction for each plane, the blur characteristics of the imaging optical system are different for respective colors, and recovery filters are used in correspondence with colors.

When an image of a three-dimensional object is captured, an object image corresponding to a position in front of or behind an in-focus position is blurred compared to an object image that matches the in-focus position. As can be seen from this phenomenon, the PSF which represents a blur of the imaging optical system varies depending on the object distance. Normally, when an object deviates to a position in front of or behind the in-focus position, the PSF changes in correspondence with the spread of the light distribution on the light-receiving surface.

The aforementioned blur correction uses the PSF corresponding to the in-focus position. Although the application of use of the blur correction is not limited, it is often the case that the blur correction is executed under the incentive that a blur of the imaging optical system, which occurs even in an in-focus state, is reduced to obtain a sharper image. When a blur is corrected using the PSF corresponding to the in-focus position, an optimal blur correction effect for an object image at the in-focus position can be obtained. Therefore, under the above incentive, it is optimal to apply blur correction using the PSF corresponding to the in-focus position. However, an image of a three-dimensional object includes an out-of-focus object image. An object (or an object image) which deviates from the in-focus position will be referred to as a "defocus object" hereinafter. When a blur is to be corrected over the entire frame of the capturing image, this defocus object also undergoes the blur correction.

FIG. 1 is a view for explaining artifacts generated upon application of the blur correction to a defocus object.

When a blur of an image obtained by capturing an object 11 (e.g., a person) by an image capturing apparatus 14 is to be corrected, a blur of an object image at an in-focus position 12 is satisfactorily corrected, and a sharp image can be obtained. However, as for an object image at a position 13 which deviates from the in-focus position 12, the blur characteristics of an imaging optical system are different from those at the in-focus position 12. When the same blur correction as that at the in-focus position 12 is applied to the object image at the position 13, false colors are generated at the contour portions of object images at the position 13. In the example shown in FIG. 1, green lines (false colors 15) are generated on the arms of an object image 16 to fringe that object image 16, thus generating artifacts.

DISCLOSURE OF INVENTION

In one aspect, an image processing apparatus comprising: an input section, configured to input image data from an image capturing device; an acquisition section, configured to acquire blur-correction coefficients corresponding to a state of an imaging optical system which forms an image represented by light coming from an object on the image capturing device; a generator, configured to generate a target component and non-target components of blur correction from the image data; a corrector, configured to apply blur correction to the target component based on the blur-correction coefficients; and a synthesizer, configured to generate image data by synthesizing the target component after the blur correction and the non-target components.

In another aspect, an image processing method comprising: using a processor to perform the steps of: inputting image data from an image capturing device; acquiring blur-correction coefficients corresponding to a state of an imaging optical system which forms an image represented by light coming from an object on the image capturing device; generating a target component and non-target components of blur correction from the image data; applying blur correction to the target component based on the blur-correction coefficients; and generating image data by synthesizing the target component after the blur correction and the non-target components.

According to these aspects, a blur of an image caused by an imaging optical system can be corrected while suppressing generation of artifacts.

In one aspect, an image processing apparatus comprising: an input section, configured to input image data from an image capturing device; an acquisition section, configured to acquire optical transfer functions for respective wavelengths corresponding to a state of an imaging optical system which forms an image represented by light coming from an object on the image capturing device; a calculator, configured to calculate blur-correction coefficients from the optical transfer functions for respective wavelengths; a generator, configured to generate a target component and non-target components of blur correction from the image data based on weighting coefficients used in calculations of the blur-correction coefficients; a corrector, configured to apply blur correction to the target component based on the blur-correction coefficients; and a synthesizer, configured to generate image data by synthesizing the target component after the blur correction and the non-target components.

In another aspect, an image processing method comprising: using a processor to perform the steps of: inputting image data from an image capturing device; acquiring optical transfer functions for respective wavelengths corresponding to a state of an imaging optical system which forms an image represented by light coming from an object on the image capturing device; calculating blur-correction coefficients from the optical transfer functions for respective wavelengths; generating a target component and non-target components of blur correction from the image data based on weighting coefficients used in calculations of the blur-correction coefficients; applying blur correction to the target component based on the blur-correction coefficients; and generating image data by synthesizing the target component after the blur correction and the non-target components.

According to these aspects, a blur of an image caused by an imaging optical system can be corrected by calculating blur-correction coefficients according to a purpose intended.

Further features of the present invention will become apparent from the following description of exemplary embodiments with reference to the attached drawings.

BRIEF DESCRIPTION OF DRAWINGS

FIG. 3 is a flowchart for explaining the processes of an image processor.

FIG. 4 is a flowchart for explaining blur correction.

FIGS. 5A to 5D are graphs for explaining factors of generation of false colors on a defocus object.

BEST MODE FOR CARRYING OUT THE INVENTION

An image processing apparatus and image processing method according to embodiments of the present invention will be described in detail hereinafter with reference to the drawings.

First Embodiment

The first embodiment will explain an image capturing apparatus which corrects a blur of an image caused by an imaging optical system while suppressing generation of false colors.

[Apparatus Arrangement]

Figure 1:
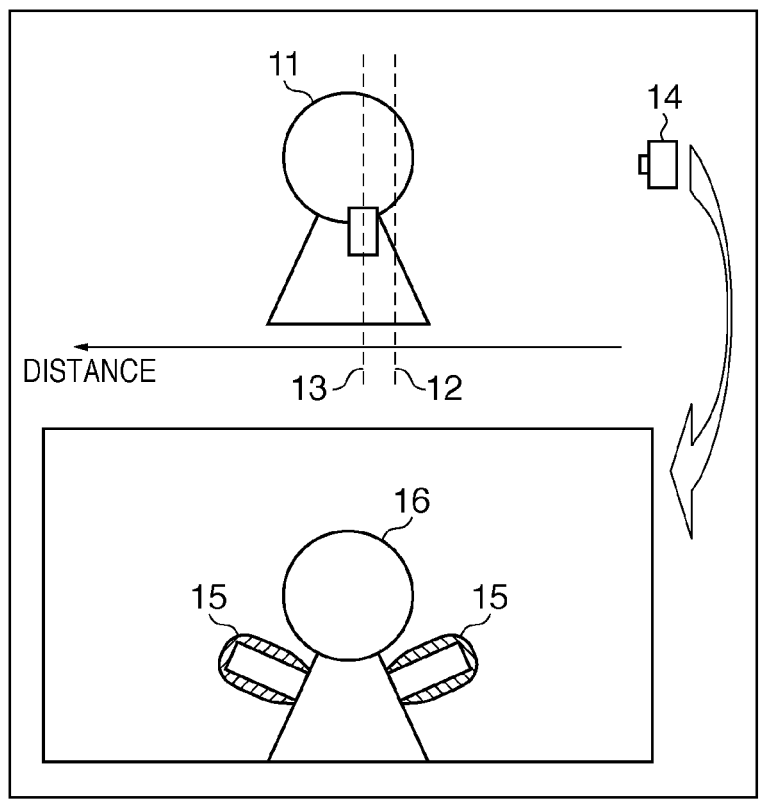
FIG. 1 is a view for explaining artifacts generated upon application of blur correction to a defocus object.
Figure 2:
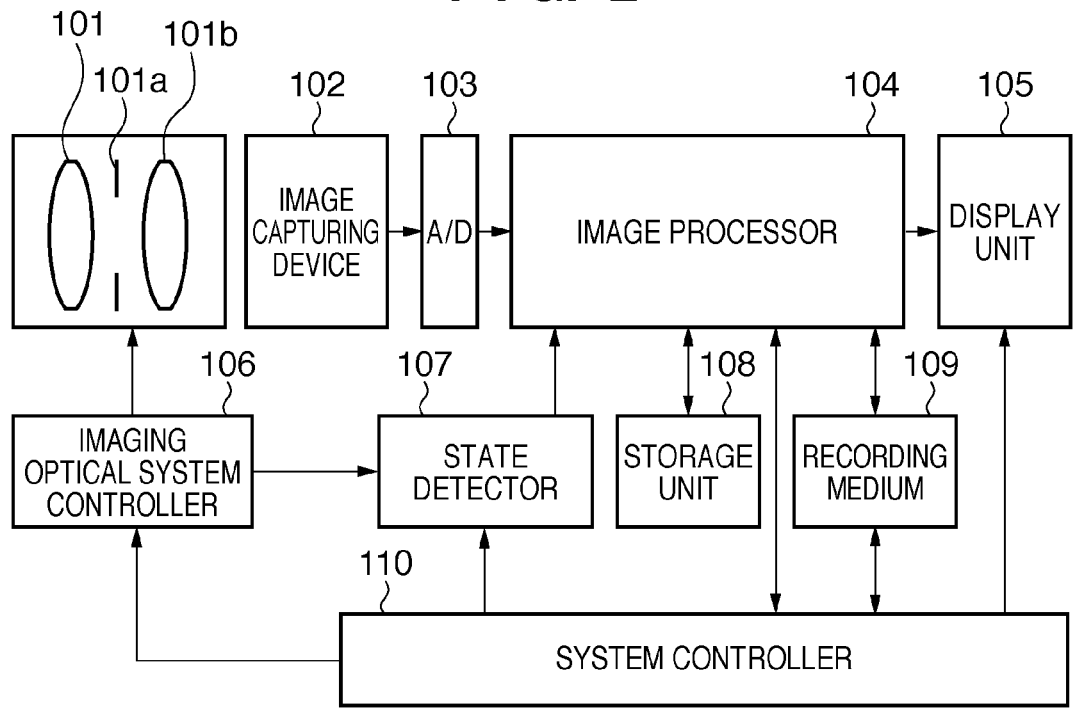
FIG. 2 is a block diagram showing the arrangement of an image capturing apparatus according to an embodiment.

FIG. 2 is a block diagram showing the arrangement of an image capturing apparatus according to the first embodiment.

Light coming from an object (not shown) forms an image on a light-receiving surface (imaging surface) of an image capturing device 102 via an imaging optical system 101. The image capturing device 102 converts the imaged light into an electrical signal. An analog-to-digital converter (A/D) 103 converts the electrical signal output from the image capturing device 102 into a digital signal (capturing data). Note that the image capturing device 102 is a photoelectric conversion device which converts a light signal imaged on the light-receiving surface into an electrical signal for each light-receiving element.

An image processor 104 stores the capturing data input from the A/D 103 in a RAM of a storage unit 108, and acquires state information (including that of the imaging optical system 101) indicating an imaging state of the image capturing apparatus from a state detector 107. The state detector 107 may acquire state information from a system controller 110 which controls the overall image capturing apparatus, or may acquire the state information of the imaging optical system 101 from, for example, an imaging optical system controller 106.

The imaging optical system controller 106 controls the aperture of a stop 101a and the position of a lens 101b of the imaging optical system 101 to control the amount of light which passes through the imaging optical system 101 and the in-focus position of the imaging optical system 101.

Then, the image processor 104 acquires blur-correction coefficients according to the state information of the imaging optical system 101 from, for example, a ROM of the storage unit 108, and applies blur correction to the buffered capturing data, as will be described in detail later. The image processor 104 stores blur-corrected image data in a recording medium 109 such as a memory card or displays it on a display unit 105. Note that in case of an image capturing apparatus with an interchangeable imaging optical system 101, the blur-correction coefficients can be stored in a memory of the corresponding imaging optical system 101.

Note that the state information of the imaging optical system 101 includes information of an aperture, a focal length (zoom position), a distance to an object, and an image height of the imaging optical system. In general, since the blur characteristics vary depending on the aforementioned parameters, various kinds of information that specify the aforementioned blur characteristics are required to implement correction according to the blur characteristics.

[Image Processor]

FIG. 3 is a flowchart for explaining the processes of the image processor 104.

The image processor 104 demosaics the buffered capturing data to generate image data (S101). Note that the image processor 104 may apply, for example, a pre-process for compensating for defects of the image capturing device 102 to the capturing data prior to demosaicing, as needed.

The image processor 104 then acquires coefficients (blur-correction coefficients) of a recovery filter according to the state information of the imaging optical system 101 from the storage unit 108 (S102), and applies blur correction to a specific image component of the image data using the recovery filter (S103).

Details of Blur Correction

FIG. 4 is a flowchart for explaining the blur correction.

The image processor 104 separates the image data into chrominance components and a luminance component (S201). For example, when image data includes three, R, G, and B planes, the image processor 104 separates each pixel data into a luminance component Y and chrominance components Ca and Cb by:

$Y = Wr \times R + Wg \times G + Wb \times B$ $Ca = R/G$ $Cb = B/G$ \hfill (5)

where Wr, Wg, and Wb are weighting coefficients.

As the weighting coefficients in the above equation, $Wr = Wg = Wb = 1/3$ may be used. The above equations are examples as long as image data can be separated into a signal indicating luminance and those indicating chromaticities. For example, image data may be separated into a luminance component and chromaticity components using a color system such as Lab or Yuv.

The image processor 104 applies a recovery filter to a luminance-component image as a blur correction target component (S202), and generates an RGB image from the luminance-component image after the blur correction and chrominance-component images as non-target components of the blur correction by inverse conversion of equations (5) (S203).

[Configuration of Recovery Filter]

Assuming that PSFs for respective R, G, and B colors are calculated based on lens design values, a PSFy for a luminance-component image is expressed by:

$$PSFy = Wr \times PSFr + Wg \times PSFg + Wb \times PSFb \qquad (6)$$

where PSFr is the PSF for an R component image,
PSFg is the PSF for a G component image, and
PSFb is the PSF for a B component image.

By synthesizing the PSFs of the respective colors using the weighting coefficients in equations (5), the PSFy for the luminance-component image can be obtained. A recovery filter for the luminance-component image is configured based on this PSFy. That is, coefficients of the blur correction process are decided based on the blur characteristics of the imaging optical system 101 associated with primary colors.

As described above, a blur caused by the imaging optical system is corrected by applying the blur correction to a luminance component. On the other hand, since the blur correction is not applied to chrominance components, the influence of blur correction on the chrominance components can be eliminated, and generation of artifacts such as false colors due to the blur correction can be suppressed.

Second Embodiment

An image process according to the second embodiment of the present invention will be described below. Note that the same reference numerals in the second embodiment denote the same parts as in the first embodiment, and a detailed description thereof will not be repeated.

The second embodiment will explain an image capturing apparatus which reduces a blur of an imaging optical system while suppressing generation of artifacts.

The first embodiment has explained the method of applying blur correction to a luminance-component image using the recovery filter created based on the blur characteristics of a luminance component, so as to suppress false colors generated upon correcting a blur of a defocus object. The second embodiment will explain an example in which blur characteristics as a basis of a recovery filter are calculated in consideration of the characteristics, and are applied to blur correction.

[Property of Blur Characteristics]

FIGS. 5A to 5D are graphs for explaining factors of generation of false colors on a defocus object, that is, views which plot OTFs for single-wavelength light corresponding to R, G, and B.

FIG. 5A is a graph showing the OTFs of the imaging optical system for an object image at the in-focus position. That is, at the in-focus position, OTF plots corresponding to R, G, and B overlap each other, and form a single curve.

FIG. 5B is a graph showing the OTFs of the imaging optical system for an object image located at a position in front of or behind the in-focus position. As can be seen from the characteristics shown in FIG. 5B, responses are lower than FIG. 5A for all of R, G, and B, and a blur occurs. However, a G component has a stronger response than R and B components. This means the presence of a wavelength which is insusceptible (having a small characteristic change) to the variation (deviation) from the in-focus position as the characteristics of the imaging optical system.

FIG. 5C is a graph showing the frequency characteristics of a recovery filter created based on the blur characteristics at the in-focus position. When this recovery filter is applied to a defocus object, the frequency characteristics of an image after the blur correction are obtained as the product of the characteristics shown in FIGS. 5B and 5C, as shown in FIG. 5D.

As shown in FIG. 5D, in the characteristics after the blur correction, a G component is emphasized, and false colors are generated, thus causing image quality degradation. This is a generation mechanism of false colors on a defocus object due to the blur correction.

In consideration of a purpose of suppression of generation of false colors, a method of extracting only a wavelength component which suffers less OTF variation against the deviation from the in-focus position, and applying blur correction to only that component is available. Blur correction based on this method will be described below.

[Calculation of Blur Characteristics]

Figure 6:
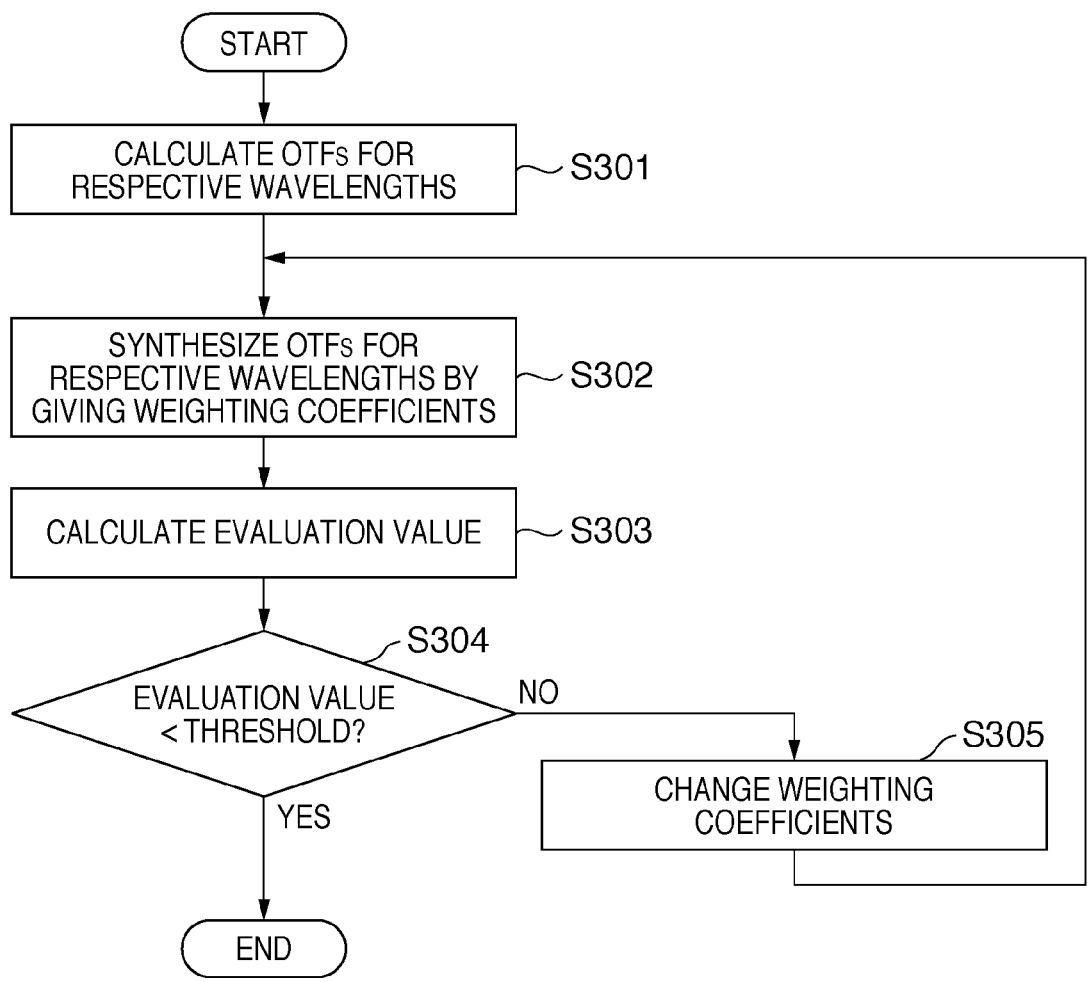
FIG. 6 is a flowchart showing a blur characteristic creation method.

FIG. 6 is a flowchart showing a blur characteristic creation method.

OTFs for respective wavelengths are calculated from design values of the imaging optical system by, for example, a ray tracing method (S301).

Alternatively, more practical OTFs of the imaging optical system may be calculated in consideration of, for example, tolerance. In an actual imaging optical system, an allowable error range such as deviations of attached positions of lenses is often specified as tolerance. Since imaging optical systems are manufactured within this tolerance range, the OTFs of an actual imaging optical system are sometimes slightly different from those calculated from design values. For this reason, in consideration of tolerance, more practical OTFs of the imaging optical system may be calculated for respective wavelengths.

More specifically, a plurality of OTFs may be calculated within various error ranges, and these OTFs may be averaged to obtain the OTFs of the practical imaging optical system. Note that when an OTF variation due to tolerance is large, a variation of the blur correction result also becomes large. Hence, the following device may be taken. That is, a recovery filter may be configured to suppress the degree of recovery at a spatial frequency at which the OTF variation due to tolerance is large, so as to adjust quality levels after the blur correction.

As for divisions of wavelengths, for example, the wavelength range of visible light may be divided in increments of 10 nm. As the divisions are finer, the precision can be enhanced, but the processing load becomes heavier. The divisions are determined in consideration of such points.

Figure 7:
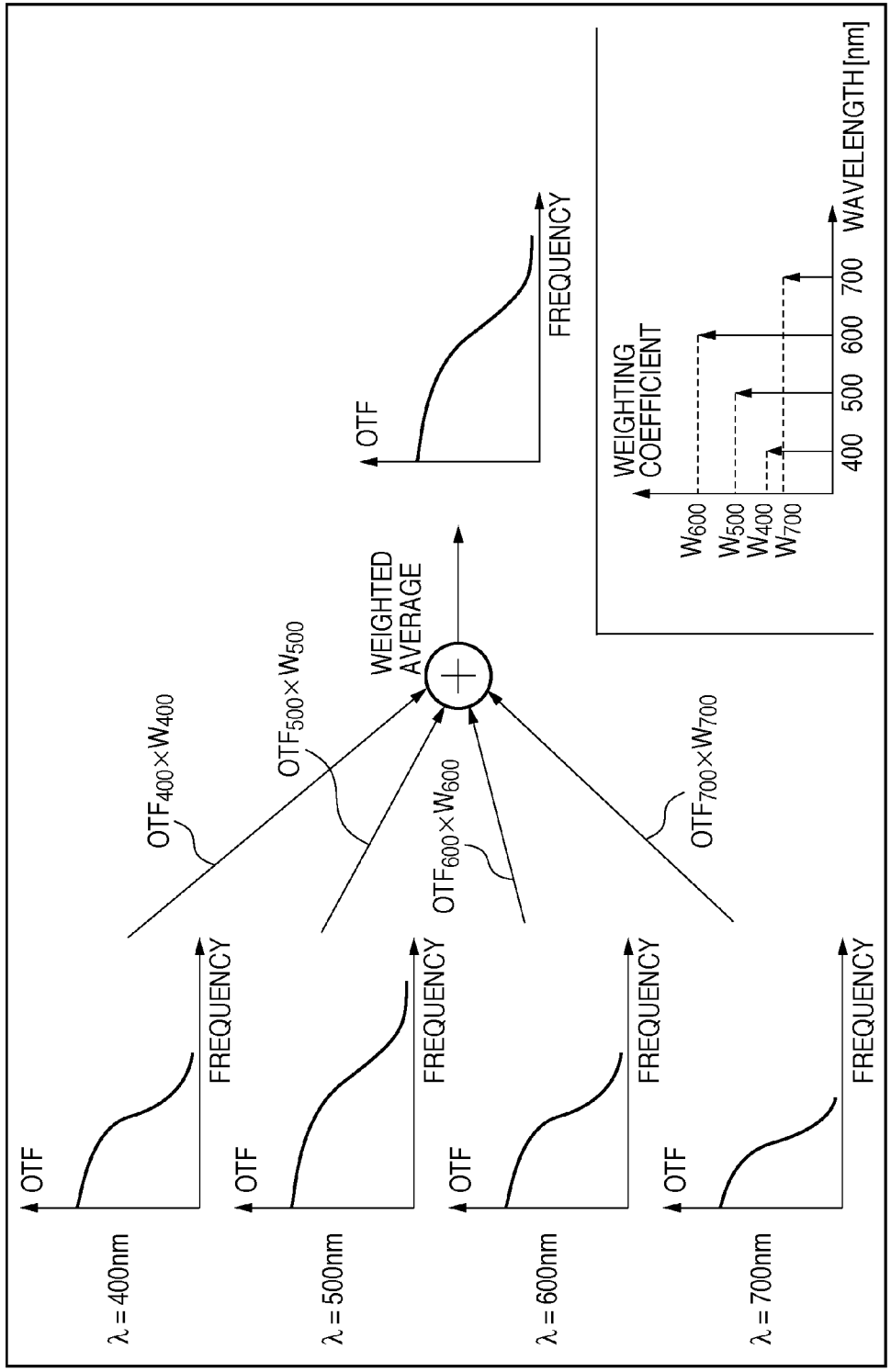
FIG. 7 is a view showing the concept of synthesizing OTFs for respective wavelengths.

Then, the OTFs for respective wavelengths are synthesized by giving certain weighting coefficients (S302). FIG. 7 shows the concept of synthesizing the OTFs for respective wavelengths. This synthesizing process can be implemented by weighted-averaging the OTFs for respective wavelengths. The weighting coefficients used in the synthesizing process are those optimized by repetitive processes. Initial values of the weighting coefficients may be uniformly set for, for example, all the wavelengths. In order to achieve the above purpose (suppression of generation of false colors), OTFs for variations from the in-focus position have to be regarded. Therefore, OTFs for respective wavelengths at each of a plurality of positions deviating from the in-focus position are calculated, and are synthesized using the same weighting coefficients.

Then, based on an evaluation formula, the synthesized OTF for the in-focus position (to be referred to as an in-focus position OTF hereinafter) is compared with the synthesized OTFs for the plurality of positions deviating from the in-focus position (to be referred to as defocus position OTFs), and their variations are evaluated. For example, a standard deviation of a set of OTFs including the in-focus position OTF and the plurality of defocus position OTFs is calculated as an evaluation value (S303), and if the evaluation value is less than a predetermined threshold (evaluation value<threshold), it is determined that the weighting coefficients used are appropriate (S304). In this case, the weighting coefficients used in the synthesizing process in step S302 and the in-focus position OTF calculated in step S303 are used in blur correction.

If the evaluation value≧the threshold, the weighting coefficients are changed (S305), and the process returns to step S302. Then, the weighting coefficients are changed until the evaluation value<the threshold is satisfied.

With the above processes, the in-focus position OTF which is synthesized using a large weighting coefficient for a wavelength having a small characteristic change against the deviation from the in-focus position can be obtained. It is not always true that the number of wavelengths having a small characteristic change against the deviation from the in-focus position is one. Therefore, two sets of weighting coefficients, that is, those for increasing the weights of two wavelengths having a small characteristic change against the deviations from the in-focus position may be obtained by the aforementioned process, and the average value of these weighting coefficient and the synthesized OTF of these in-focus position OTFs may be used in blur correction.

[Image Processor]

Figure 8:
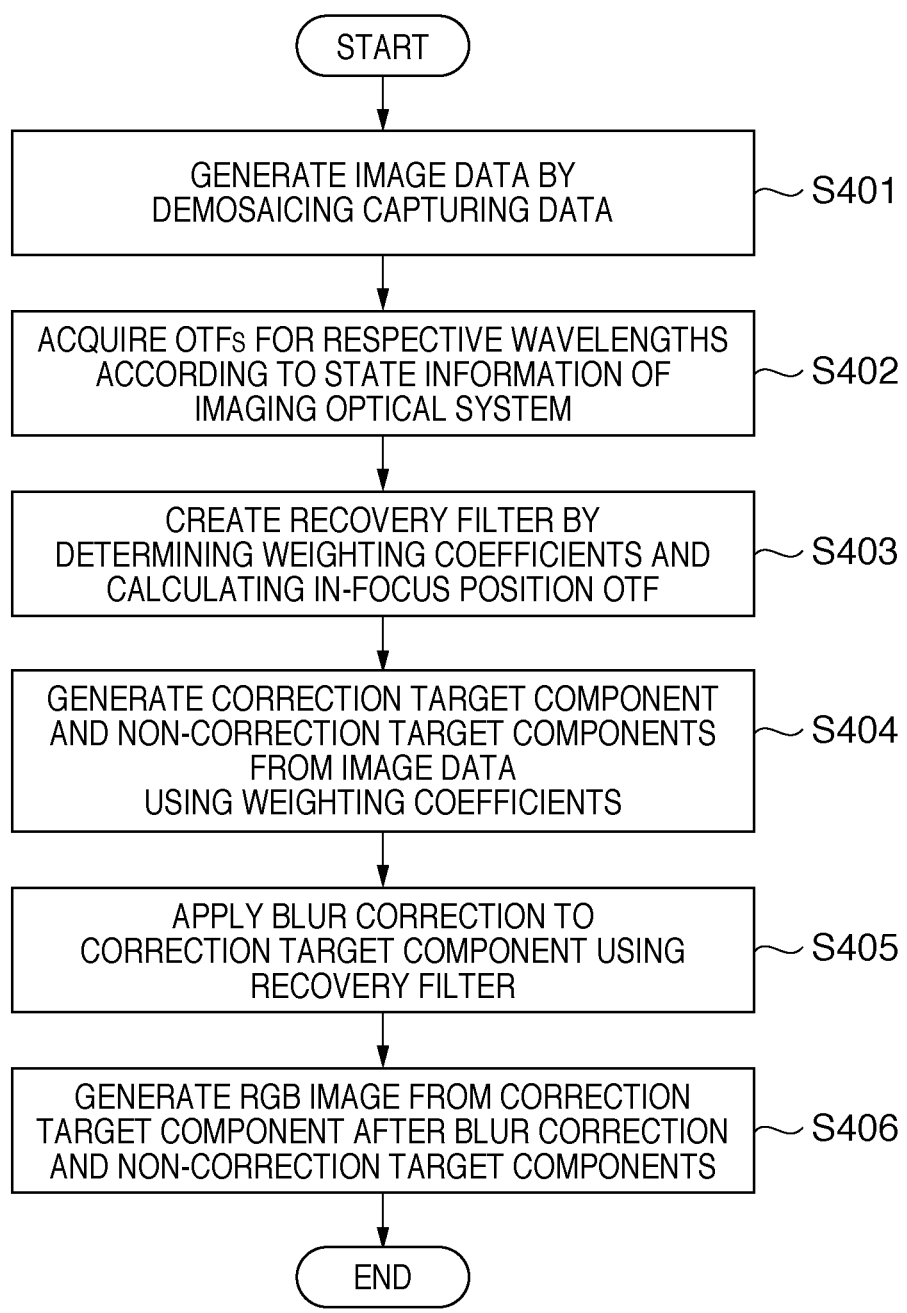
FIG. 8 is a flowchart for explaining the processes of an image processor according to the second embodiment.

FIG. 8 is a flowchart for explaining the processes of the image processor 104 according to the second embodiment.

The image processor 104 demosaics buffered capturing data to generate image data (S401). Note that the image processor 104 may apply, for example, a pre-process for compensating for defects of the image capturing device 102 to the capturing data prior to demosaicing, as needed.

The image processor 104 acquires OTFs for respective wavelengths at the in-focus position and positions before and after the in-focus position according to the state information of the imaging optical system 101 from the storage unit 108 (S402), and determines the weighting coefficients by the aforementioned processes. Then, the image processor 104 calculates an in-focus position OTF, and creates a recovery filter (by calculating blur-correction coefficients) (S403). Note that the image processor 104 may calculate the blur-correction coefficients and weighting coefficients corresponding to each state information of the imaging optical system 101 in advance, and may record them in a table of the storage unit 108. Then, the image processor 104 may acquire the blur-correction coefficients and weighting coefficients based on the state information of the imaging optical system 101 with reference to the table. Note that in case of an image capturing apparatus with an interchangeable imaging optical system 101, that table may be stored in a memory in the corresponding imaging optical system 101.

The image processor 104 generates a correction target component and non-correction target components from image data as a blur correction target (S404). The meaning of generation of a correction target component and non-correction target components from image data is as follows.

If light has a spectral distribution similar to a weighting coefficient $w(\lambda)$ calculated in consideration of a wavelength having a small characteristic change against the deviation from the in-focus position, a characteristic change against the deviation from the in-focus position of the imaging optical system is small. Upon capturing light with such spectral distribution, the RGB values of that light become proportional to (Wr', Wg', Wb'). Therefore, when the RGB values are considered as a three-dimensional vector, a projection to a vector (Wr', Wg', Wb') is a component having a small characteristic change against the deviation from the in-focus position. Conversely, a component orthogonal to the vector (Wr', Wg', Wb') has a large characteristic change against the deviation from the in-focus position. Since a correction target component J is a projection component to the vector (Wr', Wg', Wb') of the RGB values, it has a small blur characteristic change against the deviation from the in-focus position.

Letting $w(\lambda)$ be the weighting coefficients decided in step S403 and $Rr(\lambda)$, $Rg(\lambda)$, and $Rb(\lambda)$ be the spectral sensitivities of R, G, and B channels, the image processor 104 calculates coefficients Wr', Wg', and Wb' by:

$$Wr' = \int Rr(\lambda)w(\lambda)d\lambda$$

$$Wg' = \int Rg(\lambda)w(\lambda)d\lambda$$

$$Wb' = \int Rb(\lambda)w(\lambda)d\lambda \tag{7}$$

Subsequently, the image processor 104 calculates a correction target component J from R, G, and B planes using coefficients by:

$$J = Wr' \times R + Wg' \times G + Wb' \times B \tag{8}$$

Equation (8) is similar to equation (5) of the luminance-component image of the first embodiment. However, the coefficients Wr', Wg', and Wb' are calculated using the weighting coefficient $w(\lambda)$ selected to serve a specific purpose. In this point, the coefficients Wr', Wg', and Wb' are different from the coefficients Wr, Wg, and Wb of the first embodiment.

The image processor 104 calculates non-correction target components Ca' and Cb' by:

$$Ca' = Ca'r \times R + Ca'g \times G + Ca'b \times B$$

$$Cb' = Cb'r \times R + Cb'g \times G + Cb'b \times B \tag{9}$$

Note that coefficients Ca'r, Ca'g, Ca'b, Cb'r, Cb'g, and Cb'b in equations (9) are created to satisfy:

$$Wr' \times Ca'r + Wg' \times Ca'g + Wb' \times Ca'b = 0$$

$$Wr' \times Cb'r + Wg' \times Cb'g + Wb' \times Cb'b = 0 \tag{10}$$

The image processor 104 applies blur correction to the correction target component J using the recovery filter created in step S403 (S405). Then, the image processor 104 generates an RGB image from the correction target component J after the blur correction and non-correction target components Ca' and Cb' by the inverse conversion of equations (8) and (9) (S406).

As described above, a weighting coefficient for a wavelength having a small characteristic change against the deviation from the in-focus position is increased according to the purpose (suppression of generation of false colors), and OTFs for respective wavelengths are synthesized. An image component corresponding to a wavelength component having a small characteristic change against the deviation from the in-focus position is extracted, and blur correction based on the synthesized OTF is applied to that image component. As a result, blur correction that suppresses generation of false colors can be implemented.

In the above description, suppression of generation of false colors has been exemplified as the purpose. For example, application of blur correction to only an object image having a specific wavelength component may be used as a purpose. For example, when blur correction is applied to an image component corresponding to a human skin color using an OTF synthesized for each wavelength based on the spectral reflectance of the human skin color, an image in which a blur of a portrait is reduced can be obtained. Since such blur correction, which is normally required for three, R, G, and B planes, can be applied to only one plane which has high correlation with a portrait, high-speed processing can be realized.

When manufacturing variations of imaging optical systems are large in association with a specific wavelength, blur correction can be applied to an image component corresponding to a wavelength having a small manufacturing variation using an OTF synthesized for each wavelength based on a wavelength having a small manufacturing variation. In this way, blur correction that suppresses generation of artifacts due to the influence of manufacturing variations can be implemented.

In this way, the blur characteristics are calculated according to the purpose intended, and a blur of the imaging optical system is corrected based on the calculated blur characteristics, thus suppressing generation of artifacts such as false colors as a result of blur correction.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-318937, filed Dec. 15, 2008, which is hereby incorporated by reference herein in its entirety.

The invention claimed is:

1. An image processing apparatus comprising:
an input section, configured to input image data from an image capturing device;
an acquisition section, configured to acquire optical transfer functions corresponding to a state of an imaging optical system which forms an image represented by light coming from an object on the image capturing device;
a determiner, configured to determine weighting coefficients based on evaluation of a characteristic change against a deviation from an in-focus position of the imaging optical system;
a generator, configured to generate a target component and non-target components of blur correction from the image data based on the determined weighting coefficients;
a corrector, configured to apply blur correction to the target component using a blur-correction filter generated based on the acquired optical transfer functions; and
a synthesizer, configured to generate image data by synthesizing the target component after the blur correction and the non-target components,
wherein the acquisition section acquires the optical transfer functions for respective wavelengths at an in-focus position of the imaging optical system and at positions before and after the in-focus position, and
wherein the apparatus further comprises a calculator configured to weighted-average the acquired optical transfer functions for respective wavelengths at the in-focus position and at the positions before and after the in-focus position using the determined weighting coefficients and to calculate blur-correction coefficients as the blur-correction filter from the weighted averages corresponding to the in-focus position using weighting coefficients for which a standard deviation of these weighted averages is less than a predetermined threshold.

2. The apparatus according to claim 1, wherein the corrector corrects a blur of an image caused by the imaging optical system.

3. The apparatus according to claim 1, wherein the acquisition section acquires the optical transfer functions for respective wavelengths.

4. The apparatus according to claim 3, wherein the calculator is configured to calculate the blur-correction coefficients in accordance with the acquired optical transfer functions for respective wavelengths and the determined weighting coefficients.

5. The apparatus according to claim 1, wherein the determiner determines the weighting coefficients by repeating the evaluation.

6. The apparatus according to claim 1, wherein the calculator is configured to calculate the blur-correction coefficients in accordance with tolerance data of the imaging optical system.

7. An image processing method comprising:
using a processor to perform the steps of:
(a) inputting image data from an image capturing device;
(b) acquiring optical transfer functions corresponding to a state of an imaging optical system which forms an image represented by light coming from an object on the image capturing device;
(c) determining weighting coefficients based on evaluation of a characteristic change against a deviation from an in-focus position of the imaging optical system;
(d) generating a target component and non-target components of blur correction from the image data based on the determined weighting coefficients;
(e) applying blur correction to the target component using a blur-correction filter generated based on the acquired optical transfer functions; and
(f) generating image data by synthesizing the target component after the blur correction and the non-target components,
wherein, in the acquiring step, the optical transfer functions for respective wavelengths at an in-focus position of the imaging optical system and at positions before and after the in-focus position are acquired, and
wherein the processor further performs the steps of:
g) weighted-averaging the acquired optical transfer functions for respective wavelengths at the in-focus position and at the positions before and after the in-focus position using the determined weighting coefficients, and
(h) calculating blur-correction coefficients as the blur-correction filter from the weighted averages corresponding to the in-focus position using weighting coefficients for which a standard deviation of these weighted averages is less than a predetermined threshold.

8. A non-transitory computer-readable medium storing a computer-executable program for causing a computer to perform an image processing method, the method comprising the steps of:
inputting image data from an image capturing device;

acquiring optical transfer functions corresponding to a state of an imaging optical system which forms an image represented by light coming from an object on the image capturing device;

determining weighting coefficients based on evaluation of a characteristic change against a deviation from an in-focus position of the imaging optical system;

generating a target component and non-target components of blur correction from the image data based on the determined weighting coefficients;

applying blur correction to the target component using a blur-correction filter generated based on the acquired optical transfer functions; and generating image data by synthesizing the target component after the blur correction and the non-target components, wherein, in the acquiring step, the optical transfer functions for respective wavelengths at an in-focus position of the imaging optical system and at positions before and after the in-focus position are acquired, and wherein the method further comprises the steps of:

(a) weighted-averaging the acquired optical transfer functions for respective wavelengths at the in-focus position and at the positions before and after the in-focus position using the determined weighting coefficients, and (b) calculating blur-correction coefficients as the blur-correction filter from the weighted averages corresponding to the in-focus position using weighting coefficients for which a standard deviation of these weighted averages is less than a predetermined threshold.

\* \* \* \* \*